(Model.)
P. T. FORTIN.
Means for Attaching Loom Pickers to their Staves.
No. 241,345.  Patented May 10, 1881.
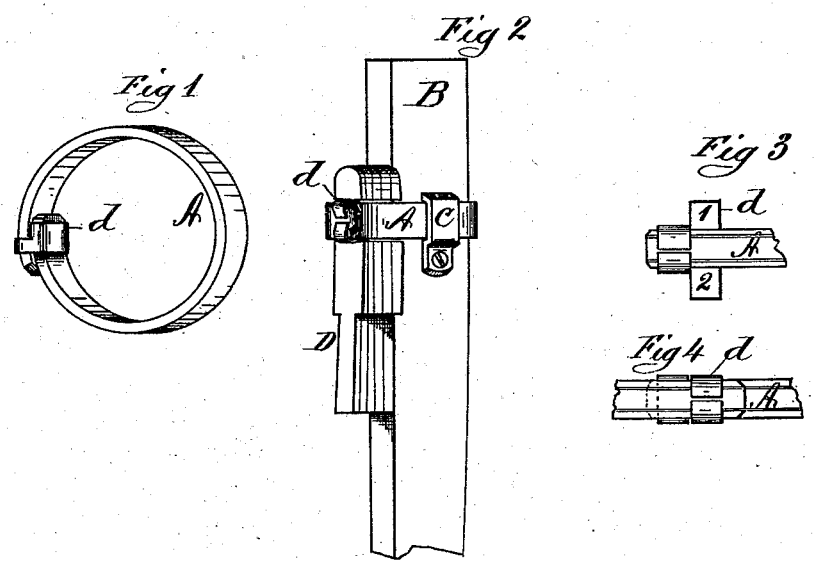
Witnesses
Wm H Chapin
H A Chapin
Inventor
Peter T Fortin
By Chapin & Co
Atty's

UNITED STATES PATENT OFFICE.

PETER T. FORTIN, OF CHICOPEE, MASSACHUSETTS, ASSIGNOR OF ONE-THIRD TO FRANK OBREY, OF COLLINSVILLE, CONNECTICUT.

MEANS FOR ATTACHING LOOM-PICKERS TO THEIR STAVES.

SPECIFICATION forming part of Letters Patent No. 241,345, dated May 10, 1881.

Application filed September 27, 1880. (Model.)

*To all whom it may concern:*

Be it known that I, PETER T. FORTIN, of Chicopee, county of Hampden, and State of Massachusetts, have invented new and useful Improvements in Means for Attaching Loom-Pickers to their Staves, which improvements are fully set forth in the annexed specification and in the accompanying drawings.

The object of my invention is to provide a collar for attaching the picker to the picker-staff which is less subject to breaking than ordinary collars are; and it consists of a strap of leather having its ends firmly united, and arranged to be placed around the picker and picker-staff and to be fastened upon the latter by a peculiarly-constructed collar-clamp, which obviates the necessity of punching or piercing any holes in the collar, whereby it becomes more or less weakened and is rendered likely to break.

Referring to the drawings, which consist of four figures, Figure 1 is a view of my collar complete. Fig. 2 is a view of that portion of the picker-staff to which the picker is attached, showing the latter attached to the former by one of my collars and the collar-clamp in place over the collar and screwed to the staff. Fig. 3 is a view of one end of a collar-strap with the end clamp partially secured thereto. Fig. 4 is a face view of the ends of the collar clamped together.

In the drawings, A is the collar. B is the picker-staff. D is the picker. C is the collar-clamp. *d* is the end clamp.

In constructing my collars I make a clamp, *d*, of metal, cut so that each side of the width of the collar there are two flaps like those numbered 1 and 2, Fig. 3, and clamp two of said flaps firmly upon one end of the collar-strap, as shown in Fig. 3, and, bringing the opposite end of the strap around, I lay it upon the flaps just bent down upon the collar, and then clamp the remaining two flaps upon it, as shown in Fig. 4, thus uniting the two ends of the strap so firmly that no strain that the collar may be subjected to in use can separate them.

In using my collar I slip it over the picker and onto the end of the picker-staff, and drive the collar and picker together down to a proper position on the staff. I then make a clamp, C, of the form shown in Fig. 2, which has a bearing against staff B above and below collar A, but leaving a comparatively free passage between said bearing-points for the collar, and having a projection on one end for the insertion of a screw through it, as shown, into staff B. This clamp C, made as above set forth, I fasten against the side of staff B and over collar A, as shown in Fig. 2, after having put the picker and collar onto it, as above described, fastening it with a screw, as shown, and said clamp thus keeps the collar from sliding either up or down upon the staff; and the collar is not pierced for the insertion of any screw or rivet through it into the picker-staff, whereby its strength would be weakened and its durability impaired.

By the use of clamp C for retaining collar A in place on the staff, a very convenient means is furnished for replacing a worn-out or broken collar by loosening the screw through the clamp and swinging its upper end sidewise, when the collar can be put on, the clamp swung back, and the screw tightened again.

It is obvious that clamp C may be made so that two screws would be required to fasten it to the staff; but one object of my invention is to so attach the collar to the staff as to avoid boring or cutting the latter, as it thereby becomes weakened; and by constructing the clamp C as shown, and by fastening it with one screw to the staff, I make the collar perfectly secure thereon by the least amount of cutting or boring into the staff that can be done, and at the same time I leave the collar intact, possessing all the strength that existed in the strap before it was formed into a collar.

What I claim as my invention is—

The combination of the picker-staff B, the picker-collar A, having its ends clamped, as described, and the collar-clamp C, substantially as and for the purpose set forth.

PETER T. FORTIN.

In presence of—
H. A. CHAPIN,
WM. H. CHAPIN.